United States Patent
Kim et al.

(10) Patent No.: US 10,200,460 B2
(45) Date of Patent: *Feb. 5, 2019

(54) SERVER-PROCESSOR HYBRID SYSTEM FOR PROCESSING DATA

(71) Applicant: International Business Machines Corporation, Armonk, NY (US)

(72) Inventors: Moon J. Kim, Wappingers Falls, NY (US); Rajaram B. Krishnamurthy, Wappingers Falls, NY (US); James R. Moulic, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,181

(22) Filed: Dec. 14, 2017

(65) Prior Publication Data

US 2018/0109597 A1 Apr. 19, 2018

Related U.S. Application Data

(63) Continuation of application No. 14/729,596, filed on Jun. 3, 2015, now Pat. No. 9,900,375, which is a
(Continued)

(51) Int. Cl.
*H04L 29/08* (2006.01)
*G06F 9/50* (2006.01)
*G06F 11/07* (2006.01)

(52) U.S. Cl.
CPC .............. *H04L 67/10* (2013.01); *G06F 9/50* (2013.01); *G06F 9/5005* (2013.01);
(Continued)

(58) Field of Classification Search
CPC .............. H04L 67/42; G06F 17/30598; G06F 17/30861; G06F 17/30864; G06F 21/6218;
(Continued)

(56) References Cited

U.S. PATENT DOCUMENTS

| 4,517,593 A | 5/1985 | Keller et al. |
| 4,893,188 A | 1/1990 | Murakami et al. |

(Continued)

FOREIGN PATENT DOCUMENTS

| EP | 1345120 A2 | 9/2003 |
| JP | 05233570 A | 9/1993 |

(Continued)

OTHER PUBLICATIONS

Kim et al., U.S. Appl. No. 11/951,712, Office Action Communication, dated Sep. 9, 2009, 26 pages.
(Continued)

*Primary Examiner* — Asad M Nawaz
*Assistant Examiner* — Najeeb Ansari
(74) *Attorney, Agent, or Firm* — Brian M. Restauro; Hoffman Warnick LLC

(57) ABSTRACT

The present invention relates to a server-processor hybrid system that comprises (among other things) a set (one or more) of front-end servers (e.g., mainframes) and a set of back-end application optimized processors. Moreover, implementations of the invention provide a server and processor hybrid system and method for distributing and managing the execution of applications at a fine-grained level via an I/O-connected hybrid system. This method allows one system to be used to manage and control the system functions, and one or more other systems to co-processor.

12 Claims, 7 Drawing Sheets

Related U.S. Application Data continuation of application No. 11/940,506, filed on Nov. 15, 2007, now Pat. No. 9,135,073.

(52) U.S. Cl.
CPC ............ *G06F 9/5044* (2013.01); *H04L 67/02* (2013.01); *H04L 67/16* (2013.01); *G06F 11/0709* (2013.01); *G06F 2209/509* (2013.01)

(58) Field of Classification Search
CPC ... G06F 17/30899; G06F 9/50; G06F 17/3056
See application file for complete search history.

(56) References Cited

U.S. PATENT DOCUMENTS

| | | |
|---|---|---|
| 5,136,662 A | 8/1992 | Maruyama et al. |
| 5,506,999 A | 4/1996 | Skillman et al. |
| 5,621,811 A | 4/1997 | Roder et al. |
| 5,659,630 A | 8/1997 | Forslund |
| 5,721,883 A | 2/1998 | Katsuo et al. |
| 5,809,078 A | 9/1998 | Tani et al. |
| 5,832,308 A | 11/1998 | Nakamura et al. |
| 6,023,637 A | 2/2000 | Liu et al. |
| 6,025,854 A | 2/2000 | Hinz et al. |
| 6,081,659 A | 6/2000 | Garza et al. |
| 6,166,373 A | 12/2000 | Mao |
| 6,215,898 B1 | 4/2001 | Woodfill et al. |
| 6,404,902 B1 | 6/2002 | Takano et al. |
| 6,456,737 B1 | 9/2002 | Woodfill et al. |
| 6,487,619 B1 | 11/2002 | Takagi |
| 6,549,992 B1 | 4/2003 | Armangau et al. |
| 6,567,622 B2 | 5/2003 | Phillips |
| 6,647,415 B1 | 11/2003 | Olarig et al. |
| 6,661,931 B1 | 12/2003 | Kawada |
| 6,671,397 B1 | 12/2003 | Mahon et al. |
| 6,744,931 B2 | 6/2004 | Komiya et al. |
| 6,825,943 B1 | 11/2004 | Barr et al. |
| 6,829,378 B2 | 12/2004 | DiFilippo et al. |
| 6,898,633 B1 | 5/2005 | Lyndersay et al. |
| 6,898,634 B2 | 5/2005 | Collins et al. |
| 6,898,670 B2 | 5/2005 | Nahum |
| 6,950,394 B1 | 9/2005 | Chou et al. |
| 6,978,894 B2 | 12/2005 | Mundt |
| 6,987,894 B2 | 1/2006 | Sasaki et al. |
| 7,000,145 B2 | 2/2006 | Werner et al. |
| 7,016,996 B1 | 3/2006 | Schober |
| 7,043,745 B2 | 5/2006 | Nygren et al. |
| 7,065,618 B1 | 6/2006 | Ghemawat et al. |
| 7,076,569 B1 | 7/2006 | Bailey et al. |
| 7,095,882 B2 | 8/2006 | Akahori |
| 7,102,777 B2 | 9/2006 | Haraguchi |
| 7,106,895 B1 | 9/2006 | Goldberg et al. |
| 7,142,725 B2 | 11/2006 | Komiya et al. |
| 7,171,036 B1 | 1/2007 | Liu et al. |
| 7,225,324 B2 | 5/2007 | Huppenthal et al. |
| 7,243,116 B2 | 7/2007 | Suzuki et al. |
| 7,299,322 B2 | 11/2007 | Hosouchi et al. |
| 7,327,889 B1 | 2/2008 | Imai et al. |
| 7,430,622 B1 | 9/2008 | Owen |
| 7,480,441 B2 | 1/2009 | Klausberger et al. |
| 7,523,148 B2 | 4/2009 | Suzuki et al. |
| 7,602,394 B2 | 10/2009 | Seki et al. |
| 7,605,818 B2 | 10/2009 | Nagao et al. |
| 7,743,087 B1 | 6/2010 | Anderson et al. |
| 7,801,895 B2 | 9/2010 | Hepper et al. |
| 7,971,011 B2 | 6/2011 | Furukawa et al. |
| 8,052,272 B2 | 11/2011 | Smith et al. |
| 8,078,837 B2 | 12/2011 | Kajihara |
| 8,086,660 B2 | 12/2011 | Smith |
| 8,094,157 B1 | 1/2012 | Le Grand |
| 2002/0002636 A1 | 1/2002 | Vange et al. |
| 2002/0004816 A1* | 1/2002 | Vange ............... G06F 9/5027 709/202 |
| 2002/0129216 A1 | 9/2002 | Collins |
| 2002/0164059 A1 | 11/2002 | DiFilippo et al. |
| 2002/0198371 A1 | 12/2002 | Wang |
| 2003/0031355 A1 | 2/2003 | Nagatsuka |
| 2003/0033520 A1 | 2/2003 | Peiffer |
| 2003/0053118 A1 | 3/2003 | Muramoto et al. |
| 2003/0061365 A1 | 3/2003 | White |
| 2003/0092980 A1 | 5/2003 | Nitz |
| 2003/0113034 A1 | 6/2003 | Komiya et al. |
| 2004/0024810 A1 | 2/2004 | Choubey et al. |
| 2004/0062265 A1 | 4/2004 | Poledna |
| 2004/0062454 A1 | 4/2004 | Komiya et al. |
| 2004/0091243 A1 | 5/2004 | Theriault et al. |
| 2004/0122790 A1 | 6/2004 | Walker et al. |
| 2004/0143631 A1 | 7/2004 | Banerjee et al. |
| 2004/0153751 A1 | 8/2004 | Marshal et al. |
| 2004/0156546 A1 | 8/2004 | Kloth |
| 2004/0170313 A1 | 9/2004 | Nakano et al. |
| 2004/0186371 A1 | 9/2004 | Toda |
| 2004/0217956 A1 | 11/2004 | Besl et al. |
| 2004/0225897 A1 | 11/2004 | Norton |
| 2004/0228515 A1 | 11/2004 | Okabe et al. |
| 2004/0233036 A1 | 11/2004 | Sefton |
| 2004/0252467 A1 | 12/2004 | Dobbs et al. |
| 2004/0260895 A1 | 12/2004 | Werner et al. |
| 2005/0013960 A1 | 1/2005 | Ozeki et al. |
| 2005/0022038 A1 | 1/2005 | Kaushik et al. |
| 2005/0044132 A1 | 2/2005 | Campbell et al. |
| 2005/0063575 A1 | 3/2005 | Ma et al. |
| 2005/0080928 A1 | 4/2005 | Beverly et al. |
| 2005/0083338 A1 | 4/2005 | Yun et al. |
| 2005/0084137 A1 | 4/2005 | Kim et al. |
| 2005/0093990 A1 | 5/2005 | Aoyama |
| 2005/0113960 A1 | 5/2005 | Karau et al. |
| 2005/0126505 A1 | 6/2005 | Gallager et al. |
| 2005/0219253 A1 | 10/2005 | Piazza et al. |
| 2005/0259866 A1 | 11/2005 | Jacobs et al. |
| 2005/0263678 A1 | 12/2005 | Arakawa |
| 2006/0013473 A1 | 1/2006 | Woodfill et al. |
| 2006/0047794 A1 | 3/2006 | Jezierski |
| 2006/0117238 A1 | 6/2006 | DeVries et al. |
| 2006/0129697 A1 | 6/2006 | Vange |
| 2006/0135117 A1 | 6/2006 | Laumen et al. |
| 2006/0149798 A1 | 7/2006 | Yamagami |
| 2006/0155805 A1* | 7/2006 | Kim .................. H04L 67/1002 709/203 |
| 2006/0171452 A1 | 8/2006 | Waehner |
| 2006/0184296 A1 | 8/2006 | Voeller et al. |
| 2006/0190627 A1 | 8/2006 | Wu et al. |
| 2006/0235863 A1 | 10/2006 | Khan |
| 2006/0239194 A1 | 10/2006 | Chapell |
| 2006/0250514 A1 | 11/2006 | Inoue et al. |
| 2006/0268357 A1 | 11/2006 | Vook et al. |
| 2006/0269119 A1 | 11/2006 | Goldberg et al. |
| 2006/0274971 A1 | 12/2006 | Kumazawa |
| 2006/0279750 A1 | 12/2006 | Ha |
| 2007/0006285 A1 | 1/2007 | Stafie |
| 2007/0126744 A1 | 6/2007 | Tsutsumi |
| 2007/0146491 A1 | 6/2007 | Tremblay et al. |
| 2007/0150568 A1 | 6/2007 | Ruiz |
| 2007/0159642 A1 | 7/2007 | Choi |
| 2007/0174294 A1 | 7/2007 | Srivastava |
| 2007/0198677 A1 | 8/2007 | Ozhan |
| 2007/0229888 A1 | 10/2007 | Matsui |
| 2007/0245097 A1 | 10/2007 | Gschwind et al. |
| 2007/0250519 A1 | 10/2007 | Fineberg et al. |
| 2008/0013862 A1 | 1/2008 | Isaka et al. |
| 2008/0036780 A1 | 2/2008 | Liang et al. |
| 2008/0063387 A1 | 3/2008 | Yahata et al. |
| 2008/0092744 A1 | 4/2008 | Storbo et al. |
| 2008/0129740 A1 | 6/2008 | Itagaki et al. |
| 2008/0140771 A1 | 6/2008 | Vass et al. |
| 2008/0144880 A1 | 6/2008 | DeLuca |
| 2008/0147781 A1 | 6/2008 | Hopmann et al. |
| 2008/0154892 A1 | 6/2008 | Liu |
| 2008/0177964 A1 | 7/2008 | Takahashi et al. |
| 2008/0189752 A1 | 8/2008 | Moradi |
| 2008/0259086 A1 | 10/2008 | Doi et al. |
| 2008/0260297 A1 | 10/2008 | Chung et al. |
| 2008/0263154 A1 | 10/2008 | Van Datta |
| 2008/0270979 A1 | 10/2008 | McCool et al. |

(56) References Cited

U.S. PATENT DOCUMENTS

| | | | |
|---|---|---|---|
| 2009/0003542 | A1 | 1/2009 | Ramanathan et al. |
| 2009/0052542 | A1 | 2/2009 | Romanovskiy et al. |
| 2009/0066706 | A1 | 3/2009 | Yasue et al. |
| 2009/0074052 | A1 | 3/2009 | Fukuhara et al. |
| 2009/0083263 | A1 | 3/2009 | Felch et al. |
| 2009/0089462 | A1 | 4/2009 | Strutt |
| 2009/0150555 | A1 | 6/2009 | Kim et al. |
| 2009/0150556 | A1 | 6/2009 | Kim et al. |
| 2009/0187654 | A1 | 7/2009 | Raja et al. |
| 2009/0265396 | A1 | 10/2009 | Ram et al. |
| 2010/0060651 | A1 | 3/2010 | Gala et al. |

FOREIGN PATENT DOCUMENTS

| | | |
|---|---|---|
| JP | 2001503171 A | 3/2001 |
| JP | 2007102794 A | 4/2007 |
| WO | 0068884 A1 | 4/2000 |

OTHER PUBLICATIONS

Kim et al., U.S. Appl. No. 11/940,470, Office Action Communication, dated Nov. 18, 2009, 31 pages.
Kim et al., U.S. Appl. No. 11/951,709, Office Action Communication, dated Nov. 17, 2009, 20 pages.
PCT Search Report, International Application No. PCT/EP2008/054331, dated Oct. 4, 2008, 10 pages.
Kim et al., U.S. Appl. No. 11/951,709, Office Action Communication, dated May 14, 2010 24 pages.
Kim et al., U.S. Appl. No. 11/940,470, Office Action Communication, dated Jun. 9, 2010 26 pages.
Chung et al., U.S. Appl. No. 11/738,711, Office Action Communication, dated Jun. 25, 2010, 26 pages.
Chung et al., U.S. Appl. No. 11/738,723, Office Action Communication, dated Jun. 24, 2010, 26 pages.
Kim et al., U.S. Appl. No. 11/951,712, Office Action Communication, dated Jul. 23, 2010, 25 pages.
Yang, U.S. Appl. No. 11/767,728, Office Action Communication, dated Nov. 19, 2010, 25 pages.
Tsai, U.S. Appl. No. 11/738,711, Office Action Communication, dated Nov. 9, 2010, 13 pages.
Cosby, U.S. Appl. No. 11/940,470, Office Action Communication, dated Nov. 26, 2010, 19 pages.
Yang, U.S. Appl. No. 11/877,926, Office Action Communication, dated Nov. 22, 2010, 33 pages.
Chambers, U.S. Appl. No. 11/951,709, Office Action Communication, dated Nov. 29, 2010, 21 pages.
Tsai, U.S. Appl. No. 11/738,723, Office Action Communication, dated Nov. 17, 2010, 13 pages.
Tiv, U.S. Appl. No. 11/951,712, Office Action Communication, dated Jan. 5, 2011, 18 pages.
Do, U.S. Appl. No. 11/668,875, Notice of Allowance & Fees Due, dated Aug. 13, 2010, 9 pages.
Do, U.S. Appl. No. 11/668,875, Notice of Allowance & Fees Due, dated Sep. 20, 2010, 8 pages.
Kuhnen, PCT / EP2008 / 050443, Invitation to Pay Additional Fees, dated Apr. 25, 2008, 6 pages.
Eveno, PCT / EP2008 / 050443, International Search Report, dated Jul. 22, 2008, 5 pages.
Cussac, PCT / EP2008 / 050443, PCT International Preliminary Report on Patentability, dated Aug. 4, 2009, 8 pages.
Tsung Yin Tsai, U.S. Appl. No. 11/738,711, Office Action Communication, dated Feb. 18, 2011, 17 pages.
Tsung Yin Tsai, U.S. Appl. No. 11/738,723, Office Action Communication, dated Feb. 18, 2011, 17 pages.
Cosby, Lawrence V., U.S. Appl. No. 11/940,470, Office Action Communication, dated Mar. 4, 2011, 22 pages.
Yang, Qian, U.S. Appl. No. 11/877,926, Office Action Communication, dated Mar. 23, 2011, 32 pages.
Bitar, Nancy, U.S. Appl. No. 11/782,170, Office Action Communication, dated Mar. 17, 2011, 19 pages.
Yang, Qian, U.S. Appl. No. 11/767,728, Office Action Communication, dated Mar. 15, 2011, 34 pages.
Tiv, U.S. Appl. No. 11/951,712, Office Action Communication, dated Apr. 26, 2011, 20 pages.
Tsai, U.S. Appl. No. 11/738,711, Office Action Communication, dated May 23, 2011, 16 pages.
Tsai, U.S. Appl. No. 11/738,723, Office Action Communication, dated May 23, 2011, 16 pages.
Yang, U.S. Appl. No. 11/767,728, Office Action Communication, dated Jul. 28, 2011, 32 pages.
Bitar, U.S. Appl. No. 11/782,170, Office Action Communication, dated Sep. 16, 2011, 21 pages.
Tsai, U.S. Appl. No. 11/738,711, Office Action Communication, dated Sep. 23, 2011, 20 pages.
Tsai, U.S. Appl. No. 11/738,723, Office Action Communication, dated Sep. 27, 2011, 20 pages.
Tiv, U.S. Appl. No. 11/951,712, Office Action Communication, dated Oct. 21, 2011, 27 pages.
Yang, U.S. Appl. No. 11/767,728, Office Action Communication, dated Oct. 28, 2011, 33 pages.
Tsai, U.S. Appl. No. 11/738,723, Office Action Communication, dated Nov. 4, 2011, 15 pages.
Entezari, U.S. Appl. No. 12/028,073, Office Action Communication, dated Dec. 2, 2011, 51 pages.
Tsai, U.S. Appl. No. 11/738,711, Office Action Communication, dated Nov. 4, 2011, 14 pages.
Chambers, U.S. Appl. No. 11/951,709, Office Action Communication, dated Dec. 20, 2011, 40 pages.
Cosby, U.S. Appl. No. 11/940,470, Office Action Communication, dated Dec. 22, 2011, 41 pages.
Yang, U.S. Appl. No. 11/877,926, Office Action Communication, dated Jan. 4, 2012, 40 pages.
Yang, U.S. Appl. No. 11/767,728, Office Action Communication, dated Feb. 16, 2012, 33 pages.
Bitar, U.S. Appl. No. 11/782,170, Notice of Allowance and Fees Due, dated Feb. 21, 2012, 20 pages.
Chambers, U.S. Appl. No. 11/951,709, Office Action Communication, dated Mar. 21, 2012, 27 pages.
Entezari, U.S. Appl. No. 12/028,073, Notice of Allowance & Fees Due, dated Mar. 21, 2012, 18 pages.
Yang, U.S. Appl. No. 11/877,926, Office Action Communication, dated Apr. 27, 2012, 32 pages.
Yang, U.S. Appl. No. 11/767,728, Office Action Communication, dated May 21, 2012, 49 pages.
Tsai, U.S. Appl. No. 11/738,711, Notice of Allowance & Fees Due, dated May 25, 2012, 5 pages.
Tsai, U.S. Appl. No. 11/738,723, Notice of Allowance & Fees Due, dated May 25, 2012, 31 pages.

\* cited by examiner

SERVER-PROCESSOR HYBRID SYSTEM FOR PROCESSING DATA

CROSS-REFERENCE TO RELATED APPLICATIONS

This application is related in some aspects to commonly owned and co-pending patent application Ser. No. 11/940,470, entitled "PROCESSOR-SERVER HYBRID SYSTEM FOR PROCESSING DATA", filed Nov. 15, 2007, the entire contents of which are herein incorporated by reference. This application is related in some aspects to commonly owned and co-pending patent application Ser. No. 11/877,926, entitled "HIGH BANDWIDTH IMAGE PROCESSING SYSTEM", filed Oct. 24, 2007, the entire contents of which are herein incorporated by reference. This application is related in some aspects to commonly owned and co-pending patent application Ser. No. 11/767,728, entitled "HYBRID IMAGE PROCESSING SYSTEM", filed Jun. 25, 2007, the entire contents of which are herein incorporated by reference. This application is also related in some aspects to commonly owned and co-pending patent application Ser. No. 11/738,723, entitled "HETEROGENEOUS IMAGE PROCESSING SYSTEM", filed Apr. 23, 2007, the entire contents of which are herein incorporated by reference. This application is also related in some aspects to commonly owned and co-pending patent application Ser. No. 11/738,711, entitled "HETEROGENEOUS IMAGE PROCESSING SYSTEM", filed Apr. 23, 2007, the entire contents of which are herein incorporated by reference.

FIELD OF THE INVENTION

The present invention generally relates to data processing. Specifically, the present invention relates to a server-processor hybrid system for more efficient data processing.

BACKGROUND OF THE INVENTION

Web 1.0 is historically referred to as the World Wide Web, which was originally about connecting computers and making technology more efficient for computers. Web 2.0/3.0 is considered to encompass the communities and social networks that build contextual relationships and facilitate knowledge sharing and virtual web servicing. Traditional web service can be thought of as a very thin client. That is, a browser displays images relayed by a server, and every significant user action is communicated to the front-end server for processing. Web 2.0 is a social interaction that is consisted of the software layer on the client, so the user gets quick system response. The back-end storage and retrieval of data is conducted asynchronously in the background, so the user doesn't have to wait for the network. Web 3.0 is geared towards the 3 dimensional vision such as in virtual universes. This could open up new ways to connect and collaborate using 3D shared. Along these lines, web 3.0 describes the evolution of Web usage and interaction along several separate paths. These include transforming the Web into a database, a move towards making content accessible by multiple non-browser applications.

Unfortunately, the traditional server cannot efficiently handle the characteristics of Web 3.0. No existing approach addresses this issue. In view of the foregoing, there exists a need for an approach that solves this deficiency.

SUMMARY OF THE INVENTION

The present invention relates to a server-processor hybrid system that comprises (among other things) a set (one or more) of front-end servers (e.g., mainframes) and a set of back-end application optimized processors. Moreover, implementations of the invention provide a server and processor hybrid system and method for distributing and managing the execution of applications at a fine-grained level via an I/O-connected hybrid system. This method allows one system to be used to manage and control the system functions, and one or more other systems to serve as a co-processor or accelerator for server functions.

The present invention allows the front-end server management and control system components to be reused, and the applications such as virtual web or game processing components to be used as an accelerator or co-processor. The system components can be run using different operating systems. The front-end server(s) acts as a normal transaction based computing resource, but for which these transactions may be the trigger for large computationally intense graphics, rendering or other functions. The processor is placed at the back-end to handle such functions. In addition to traditional transaction processing, the front-end server(s) would also perform specific processor selection functions, and set-up, control and management functions of the cell co-processors.

A first aspect of the present invention provides a server-processor hybrid system for processing data, comprising: a set of front-end servers for receiving the data from an external source; a set of back-end application optimized processors for receiving the data from the set of front-end servers, for processing the data, and for returning processed data to the set of front-end servers; and an interface within at least one of the set of front-end servers having a set network interconnects, the interface connecting the set of front-end servers with the set of back-end application optimized processors.

A second aspect of the present invention provides a method for processing data, comprising: receiving the data from an external source on a front-end server; sending the data from the front-end server to a back-end application optimized processor via an interface having a set of network interconnects, the interface being embodied in server; processing the data on the back-end application optimized processor to yield processed data; and receiving the processed data from the back-end application optimized processor on the front-end server.

A third aspect of the present invention provides a method for deploying a server-processor hybrid system for processing data, comprising: providing a computer infrastructure being operable to: receive the data from an external source on a front-end server; send the data from the front-end server to a back-end application optimized via an interface having a network interconnects, the interface being embodied in the front-end server; process the data on the back-end application optimized processor to yield processed data; and receive the processed data from the back-end application optimized processor on the front-end server.

BRIEF DESCRIPTION OF THE DRAWINGS

These and other features of this invention will be more readily understood from the following detailed description of the various aspects of the invention taken in conjunction with the accompanying drawings in which.

Figure 1:
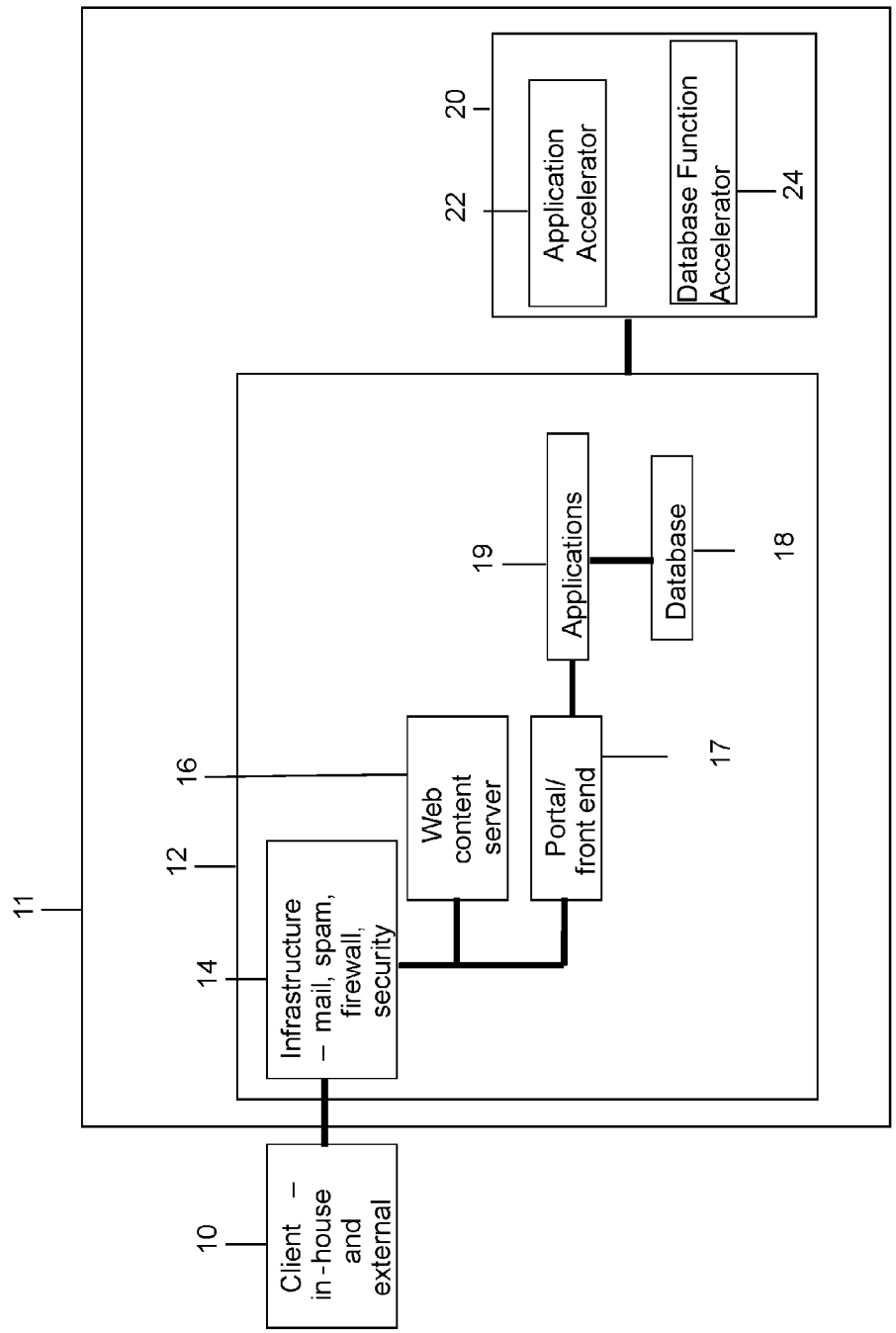
FIG. 1 shows box diagram depicting the components of the server-processor hybrid system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention relates to a server-processor hybrid system that comprises (among other things) a set (one or more) of front-end servers (e.g., mainframes) and a set of back-end application optimized processors. Moreover, implementations of the invention provide a server and processor hybrid system and method for distributing and managing the execution of applications at a fine-grained level via an I/O-connected hybrid system. This method allows one system to be used to manage and control the system functions, and one or more other systems to serves as a co-processor or accelerator.

The present invention allows the front-end server management and control system components to be reused, and the applications such as virtual web or game processing components to be used as an accelerator or co-processor. The system components can be run using different operating systems. The front-end server(s) acts as a normal transaction based computing resource. These transactions may be the trigger for large, computationally intense graphics, renderings, numerically intensive computations, or other functions. The processor is placed at the back-end to handle such functions. In addition to traditional transaction processing, the front-end server(s) would also perform specific processor selection functions, and set-up, control and management functions of the co-processors. It should be understood that as used herein, the term data can mean any type of data such as "multi-modal" data, e.g., video and/or data streams, predefined block lengths, text, graphics, picture formats, xml, html etc. Having the server at the front-end of the hybrid system provides (among other things) good at high transaction throughput, and cell processor workload management, cell processor resource management.

Referring now to FIG. 1, a logical diagram according to the present invention is shown. In general, the present invention provides a server-processor hybrid system 11 that comprises a set (one or more) of front-end servers 12 and a set of back-end application optimized processors (referred to herein as processors for brevity) 20. As shown, each server 12 typically includes infrastructure 14 (e.g., email, spam, firewall, security, etc.), a web content server 16, and portal/front-end 17 (e.g., an interface as will be further described below). Applications 19 and databases 18 are also hosted on these servers. Along these lines server(s) 12 are typically System z servers that are commercially available from IBM Corp. of Armonk, N.Y. (System z and related terms are trademarks of IBM Corp. in the United States and/or other countries). Each processor 20 typically includes one or more application function accelerators 22, and one or more database function accelerators 24. Along those lines, processor(s) 20 are typically cell blades that are commercially available from IBM Corp. (cell, cell blade and related terms are trademarks of IBM Corp in the United States and/or other countries). Moreover, processor(s) 20 are optimized based on the applications 19 that are running so that performance is optimal and efficient. As shown, server 12 receives data from an external source 10 via typically communication methods (e.g., LAN, WLAN, etc.). Such data is communicated to processor 20 for processing via an interface of server 12. Processed data can then be stored and/or returned to server 12 and onto external source 10. As depicted, server 12 represents the front-end of hybrid system 11 while processor 20 represents the back-end.

Figure 2A:
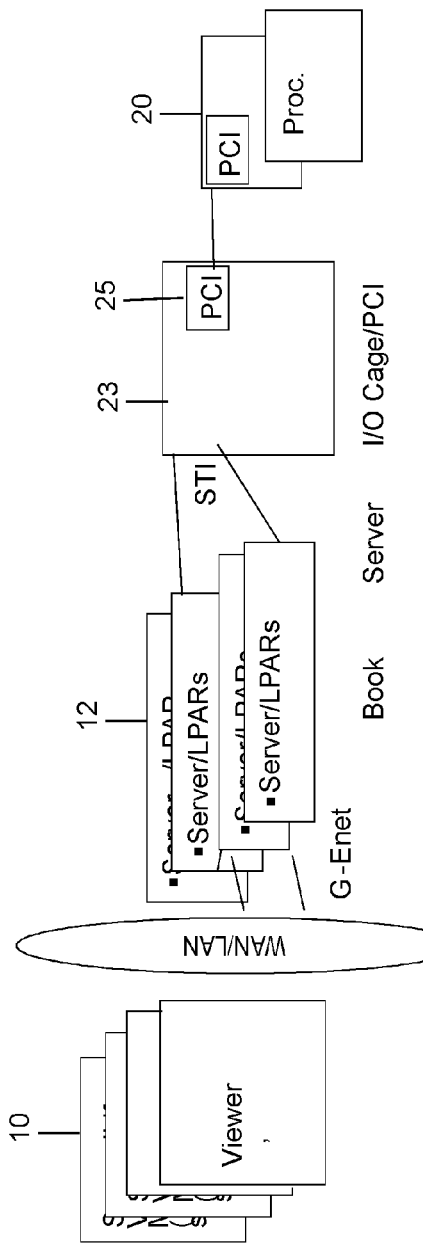
FIG. 2A shows a more detailed diagram of the system of FIG. 1 according to the present invention.
Figure 2B:
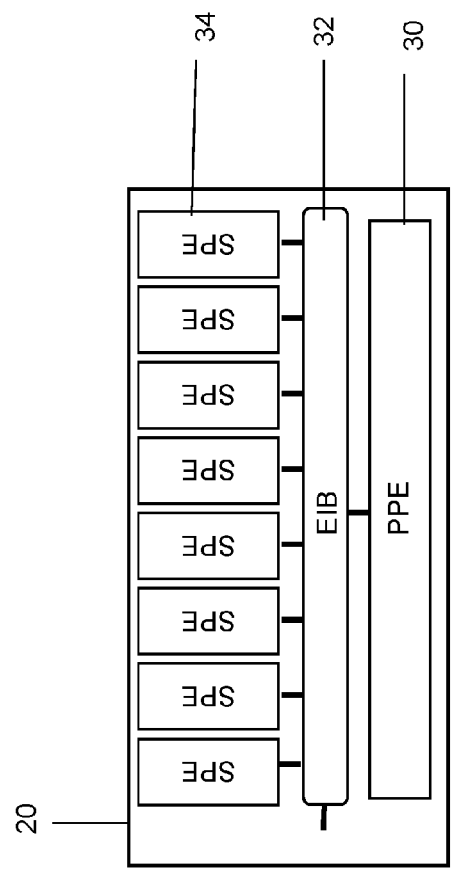
FIG. 2B shows a more specific diagram of the back-end application optimized processors(s) of the hybrid system according to the present invention.

This system is further shown in FIGS. 2A-B. FIG. 2A shows external source(s) 10 communicating server(s) 12, which communicates with processor(s) 20 via interface 23. Typically, interface 23 is an input/output (I/O) cage embodied/contained within each server 12. Interface 23 also includes a set of network interconnects such as express peripheral component interconnects (PCIs) 25. Interface 23 may also include other components as indicated in the above-incorporated patent applications.

In any event, data will be received from external source(s) 10 on processor(s) 20 and communicated to server(s) via interface(s) 23. Once received, processor(s) 20 will process the data and return the processed data to server(s) 12, which can return the same to external source(s) 10. Processor(s) 20 can also leverage staging storage and processed data storage devices to store the original data and/or the processed data. As shown in FIG. 2B, each processor 20 typically includes a power processing element (PPE) 30, an element interconnect bus (EIB) 32 coupled to the PPE 30, and a set (e.g., one or more but typically a plurality) of special purpose engines (SPEs) 34. The SPEs share the load for processing the data.

Figure 3:
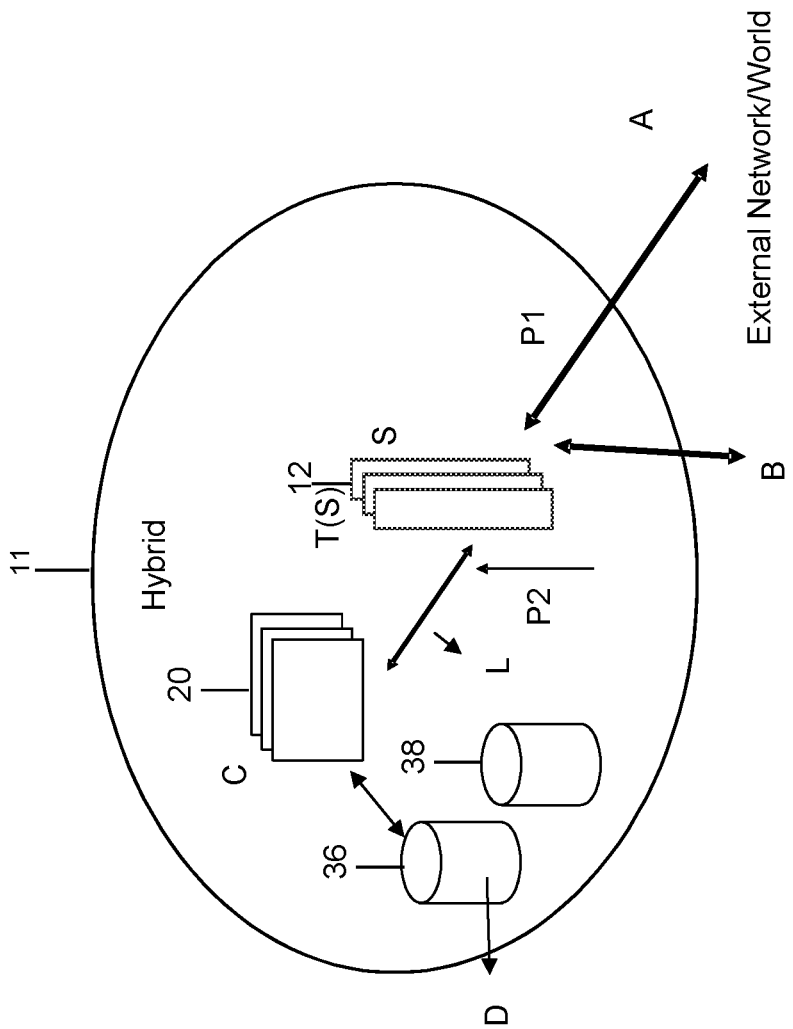
FIG. 3 shows communication flow within the server-processor hybrid system according to the present invention.
Figure 4A:
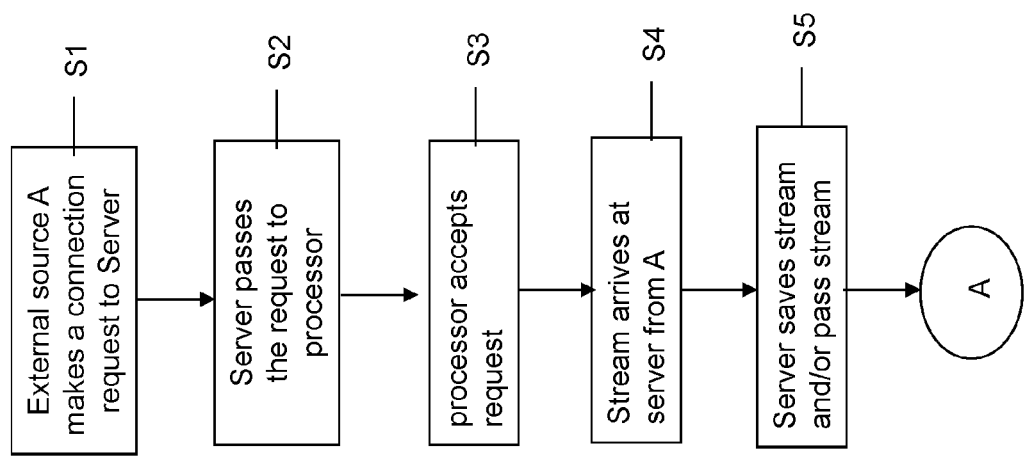
FIGS. 4A-D shows a method flow diagram according to the present invention.
Figure 4B:
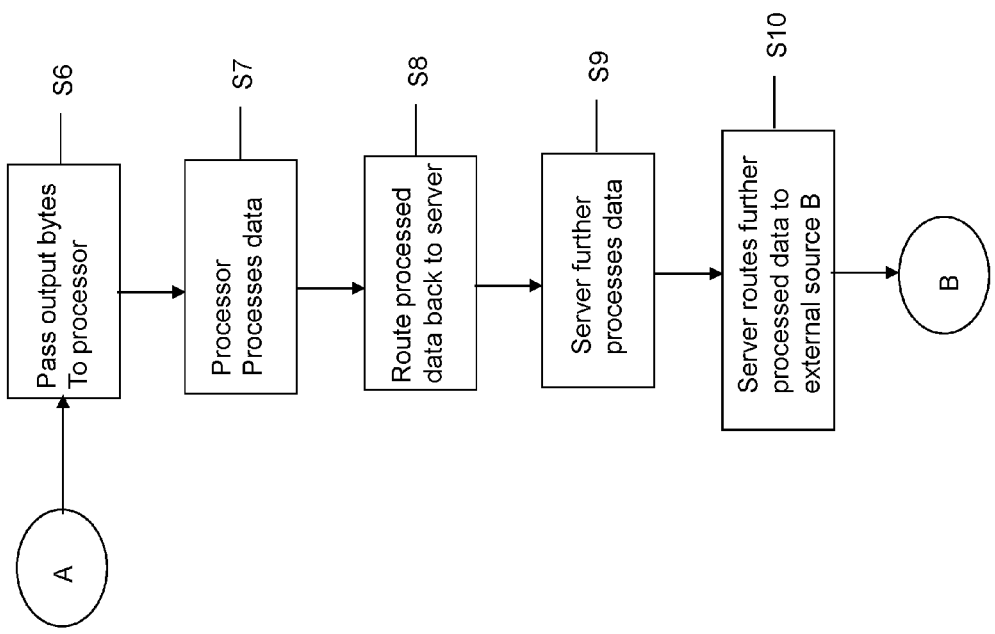
Figure 4C:
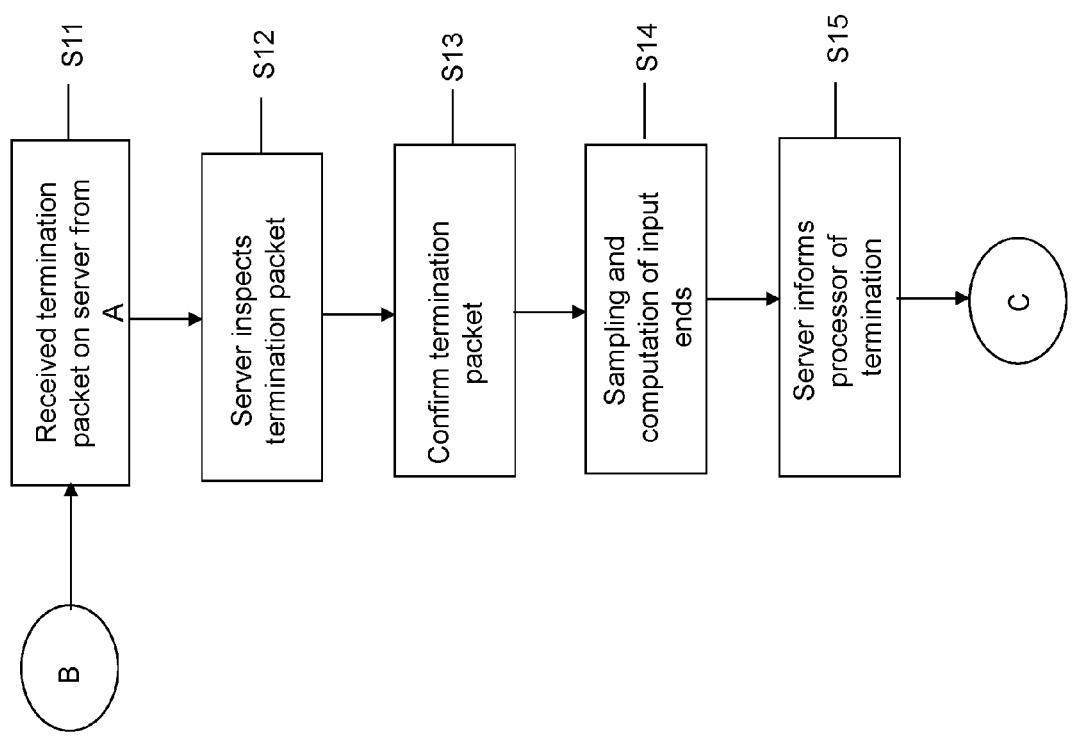
Figure 4D:
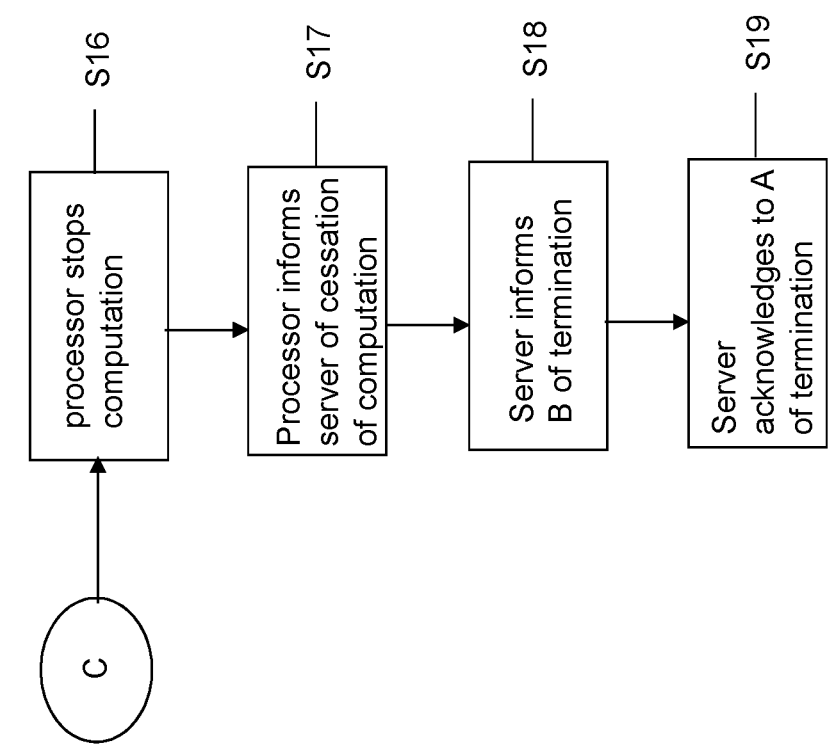

Referring briefly to FIG. 3, a more specific diagram showing the components' placement within hybrid system 11 is shown. As depicted, server(s) 12 receive/send data from external sources A and B, and route that data to processor(s) 20 for processing. After such processing, processed data is returned to server(s) 12, and to external sources A and B. Also present in hybrid system 11 is staging storage device 36 and processed data storage device 38. Staging storage device 36 can be used to store data prior to, during and/or after being processed, while processed data storage device can be used to store processed data.

Referring now to FIGS. 4A-D, a flow diagram of an illustrative process according to the present invention will be described. For brevity purposes, for the remainder of the Detailed Description of the Invention, server 12 is referred to as "S", while processor 20 is referred to as "C". In step S1 external source (A) makes a connection request. In step S2, the connection request is passed on to C after validation by server S. In step S3, C accepts connection, S informs A of connection setup completeness. In step S4 stream P arrives from A at server S. S performs P'=T(P) where T is a transformation function on stream P. In step S5, S can save the data in storage and/or pass it to another device. In step S6, output bytes are continuously passed onto C. In step S7, C performs P''=U(P') where U is transformation function performed by C. In step S8, P''' is routed to back to S. S performs $P^3$=V(P''') where V is a transformation function performed by server S in step S9. In step S10, $P^3$ is routed continuously to B or A. Additionally, in step S10, A presents connection termination packet (E). In step S11, S receives E and in S12 S inspects E. In step S13, it is determined that E is a connection termination packet. In step S14, input sampling and computation stops. In step S15, S informs C of stream completion. In step S16, C stops computation. In step S17, C informs S of computation termination. In step S18, S informs B of connection termination. In step S19, S acknowledges A of computation completion.

Although not separately shown in a diagram, the following is an example of another control flow made possible under the present invention. This control flow is useful in scenarios where requests are made directly by S to C without data being sourced from A or redirected to B.
1. S makes connection request
2. Is the connection request valid? (performed by C)
3. If yes, accepted by C
4. Stream P arrives from S at Processor C (P can also just be "block" input with a predefined length)
5. C performs T(P) where T is a transformation function on stream P
6. T(P) Output bytes are continuously passed back to S
7. S encounters End-of-File or End of Stream
8. S presents connection termination packet (E)
9. C inspects E
10. Is E a connection termination packet?
11. If Yes, stop sampling inputs, stop computation on C
12. C acknowledges S on computation termination Under the present invention, both a push model and a pull model can be used. Control messages can be sent across a separate control path with data messages being sent over the regular data path. Here two separate connection IDs are needed. Control messages can also be sent along with data messages across the same path. In this case, only one connection ID is needed. Both Push and Pull models can be realized for separate or unified data path and control path. The push model is useful for short data where latency is a concern. Control messages usually have latency bounds for data transfer. This requires engagement of the data source computer processor until all the data is pushed out. The pull model is usually useful for bulk data where the destination computer can read data directly from the source's memory without involving the source's processor. Here the latency of communicating the location and size of the data from the source to the destination can easily be amortized over the whole data transfer. In a preferred embodiment of this invention, push and pull model can be invoked selectively depending on the length of data to be exchanged.

The following steps show how the push and pull models works:
Dynamic Model Selection
  (1) S and C want to communicate. Sender (S or C) makes the following decisions
Step 1—Is data of predefined length and less than Push Threshold (PT)?
Step 2—If yes, then employ "push"
Step 3—if no, then data is of streaming nature without any known size. S "shoulder taps" C without location address of data.
Push Threshold (PT) is a parameter that can be chosen for a given application or data type (fixed length or stream) by the designer of the system.
Push Model
  S shoulder taps C with data block size (if known).
  S looks up application communication rate requirements (R).
  S looks up # of links in "link aggregation pool" (N).
  S matches R and N by expanding or shrinking N [dynamic allocation].
  S and C agree on number of links required for data transfer
  S pushes data to C.
  S can close connection in the following ways—when all data is sent (size known) & when job is complete.
  S closes connection by shoulder tap to C.
Pull Model
  S shoulder taps C with data block size (if known).
  S looks up application communication rate requirements (R).
  S looks up # of links in "link aggregation pool" (N).
  S matches R and N by expanding or shrinking N [dynamic allocation].
  S and C agree on number of links required for data transfer
  C pulls data from S memory.
  S can close connection in the following ways—when all data is sent (size known) & when job is complete.
  S closes connection by shoulder tap to C In FIG. 3, server 12 ("S") and processor 20 ("C") share access to staging storage device 36. If S needs to transfer dataset D to C then the following steps must happen—(i) S must read D and (ii) transfer D to C over link L. Instead, S can inform C of the name of the dataset and C can read this dataset directly from 36. This possible because S and C share staging device 36. The steps required for this are listed as follows (again, for brevity "S" and "C" are used to refer to server 12 and processor 20, respectively)—

Step 1—S provides dataset name & location (dataset descriptor) along control path to C. This serves as "shoulder tap". C receives this information by polling for data, "pushed" from S.
Step 2—C reads data from D using dataset descriptor.
Step 1—Push or pull implementation possible.
Step 2—Pull or push implementation possible.
Step 1 (push)—"Control Path"
S shoulder taps (writes to) C with dataset name & location (if known).
Step 1 (pull)—"Control Path"
S shoulder taps C with data block size (if known).
C pulls data from S memory.
Step 2 (Pull form)—"Data path"
Staging storage device 36 stores table with dataset name and dataset block locations.
C makes read request to staging storage device 36 with dataset name D.
staging storage device 36 provides a list of blocks.
C reads blocks from staging storage device 36
C encounters end of dataset.
C closes connection.
Step 2 (push form)—"Data Path"
Staging storage device 36 stores table with dataset name and dataset block locations.
C makes read request to staging storage device 36 with dataset name D.
storage controller of staging storage device 36 pushes disk blocks of D directly into memory of C.
D closes connection.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for processing data, comprising:

receiving the data from an external source on a front-end server;

sending the data from the front-end server to a back-end application optimized processor via an interface embodied in the front-end server, the interface having a set of network interconnects by selectively invoking a push model or a pull model, wherein the push model is selectively invoked when the data to be transmitted includes a first data type, and wherein the pull model is selectively invoked when the data to be transmitted includes a second data type that is distinct from the first data type;

processing the data on the back-end application optimized processor to yield processed data; and receiving the processed data from the back-end application optimized processor on the front-end server.

2. The method of claim 1, wherein the interface being an input/output (I/O) cage.

3. The method of claim 1, wherein the back-end application optimized processor comprising:

a power processing element (PPE);

an element interconnect bus (EIB) coupled to the PPE; and a set of special purpose engines (SPEs) coupled to the EIB.

4. The method of claim 1, wherein the set of SPEs being configured to process the data.

5. The method of claim 1, further comprising a web content server, portal, an application, an application accelerator and a database accelerator.

6. A method for deploying a server-processor hybrid system for processing data, comprising:

providing a computer infrastructure being configured to:

receive the data from an external source on a front-end server;

send the data from the front-end server to a back-end application optimized processor via an interface embodied in the front-end server, the interface having a set of network interconnects by selectively invoking a push model or a pull model, wherein the push model is selectively invoked when the data to be transmitted includes a first data type, and wherein the pull model is selectively invoked when the data to be transmitted includes a second data type that is distinct from the first data type;

process the data on the back-end application optimized processor to yield processed data; and receive the processed data from the back-end application optimized processor on the front-end server.

7. The method of claim 6, wherein the interface being an input/output (I/O) cage.

8. The method of claim 6, wherein the interface being embodied in at least one of the set of front-end servers.

9. The method of claim 6, wherein the back-end application optimized processor comprising:

a power processing element (PPE);

an element interconnect bus (EIB) coupled to the PPE; and a set of special purpose engines (SPEs) coupled to the EIB.

10. The method of claim 7, wherein the set of SPEs being configured to process the data.

11. The method of claim 6, further comprising:

a staging storage device; and a processed data storage device.

12. The method of claim 6, further comprising a web content server, portal, an application, an application accelerator and a database accelerator.

* * * * *